United States Patent [19]

Bouygues et al.

[11] 3,860,124

[45] Jan. 14, 1975

[54] DEVICE FOR THE PRECISE POSITIONING, ON A MOBILE MOUNTING, OF AN OBJECT HOLDER INTRODUCED THROUGH AN AIRLOCK INTO A VACUUM-TIGHT ENCLOSURE

[75] Inventors: Jean Bouygues; Rene Gerard, both of Paris, France

[73] Assignee: Thomson-CSF, Paris, France

[22] Filed: Oct. 11, 1973

[21] Appl. No.: 405,567

[30] Foreign Application Priority Data

Oct. 13, 1972 France .............................. 72.36420

[52] U.S. Cl. .............................................. 214/1 CM
[51] Int. Cl. .............................................. B65g 1/16
[58] Field of Search ............. 214/1 CM, 1 BB, 1 BT

[56] References Cited

UNITED STATES PATENTS 3,188,879 6/1965 Conley ............................ 214/1 CM

*Primary Examiner*—Allen N. Knowles
*Assistant Examiner*—Hadd Lane
*Attorney, Agent, or Firm*—Karl F. Ross; Herbert Dubno

[57] ABSTRACT

A device makes it possible to position in the evacuated enclosure of an irradiation apparatus, (an electron beam apparatus for instance), with an accuracy of the order of 1/100 mm a sample holder on a cross-slide table, without having to break the vacuum and by using a remote-control arrangement. In this device, an arm is movable along a fixed axis. This arm terminates in a fork and serves to transfer the object holder from a lateral airlock to said table. A shaft perpendicular to the moving arm, through the medium of an eccentric finger ensures the locking of the object holder to a "line-point-area" kind of support carried by said table.

5 Claims, 2 Drawing Figures

DEVICE FOR THE PRECISE POSITIONING, ON A MOBILE MOUNTING, OF AN OBJECT HOLDER INTRODUCED THROUGH AN AIRLOCK INTO A VACUUM-TIGHT ENCLOSURE

The present invention relates to devices for the precise positioning of an object holder introduced through an airlock into a vacuum-tight enclosure.

This is the case, for example, with the evacuated enclosure of an ion machining or an electronic masking apparatus, in which accuracies in the order of 1/100 mm in positioning the specimen-holder on a cross-slide table whose movements are controlled at the exterior, are required. Those skilled in the art will appreciate that the vacuum must be a high one (lower than $10^{-3}$ mm Hg) so that with sealed leadthrough systems of known kind, this prevents remote control from being executed other than by means of shafts capable only of rotating and longitudinally, translating lateral displacements of these shafts being necessary avoided. The specimen is introduced into the enclosure without breaking the vacuum, through an airlock arranged at one side of the apparatus. Under these conditions, which particularly limit the possibilities as far as the known remote-control means are concerned, the position of the specimen holder cannot be accurately determined in relation to the reference axes of the cross-slide table constituting the mobile mounting.

The present invention makes it possible to overcome these drawbacks.

According to the invention, there is provided a device for the precise positioning on a mobile mounting of an object holder introduced through an air lock into a sealed enclosure manipulated by means located outside said enclosure, utilising movements of rotation about fixed axes, and of translation along said axes, said device comprising a first system for displacement along a first axis (OY), means associated with said first system for displacing said object holder parallel to a second axis (OZ), and a second system, comprising means for locking said object holder, and means capable of application and subsequent withdrawal by a displacement in accordance with a third axis (OX), the axes OX, OY, OZ forming a rectangular three-coordinate system.

The invention will be better understood and others of its features rendered apparent, from a consideration of the ensuing description and the accompanying drawing in which.

Figures 1, 2:
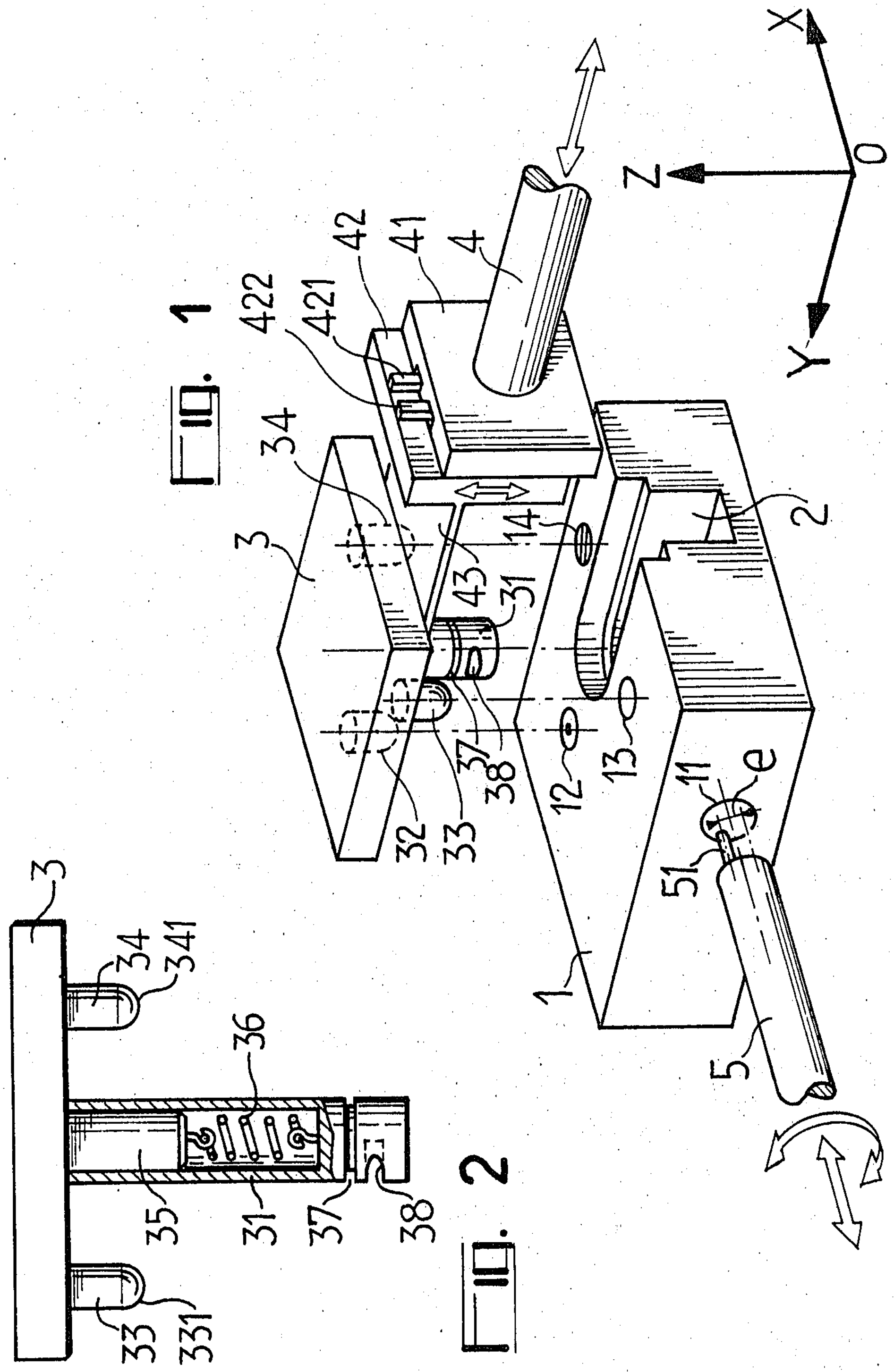
FIG. 1 is an exploded perspective view, illustrating an embodiment of the invention given by way of example.
FIG. 2 illustrates in partial section the object holder of the device shown in FIG. 1.

The example chosen is that of an electronic masking apparatus, in which an object holder or mounting 3, FIG. 1, receives a wafer of semiconductor material (not shown) or some other substrate, coated with an electron-sensitive resin film. Using this apparatus, a series of patterns each representing the mask of a semiconductor device or integrated circuit, is printed. On passage from one pattern to another, during the electronic masking operation, the object holder has to be shifted through a certain distance in order to locate the centre of the pattern at predetermined point in the apparatus. To this end, a cross-slide table is provided which is used as the mobile mounting for the object holder. In FIG. 1, only the top part 1 of said table has been shown.

The device in accordance with the invention comprises four main parts:

a mobile mounting 1 (FIG. 1);

an object holder 3 which, in the operating position, is adapted to rest at three predetermined points (12, 13 and 14) on the top face of the component 1;

a shaft 4 and its accessory parts for positioning the object holder;

a shaft 5 perpendicular to shaft 4 and various locking components, for positioning the mounting 1.

The mobile mounting comprises a receptacle 2 designed to receive a locking sleeve 31 forming part of the object holder 3.

The object holder 3 takes the form of a parallelepiped plate on large face of which is provided centrally with a rod 35 extending perpendicularly to this face inside the locking sleeve 31 which is visible only in FIG. 2, and, at the corners of a triangle circumscribing the center, three projections 32, 33 and 34 terminated in each case in spherical caps (331 and 341 visible in FIG. 2). The locking sleeve 31, comprises:

a cylindrical cavity designed to receive rod 35;

an oblong cavity 38 whose function will be described hereinafter;

a circular locking groove 37.

Thanks to the provision of a spring 36 which exerts a pull between the end of the rod 35 and the bottom of the cylindrical cavity in the component 31, the latter is maintained in contact with the component 3.

The points 12, 13 and 14 represent a support of the kind well known in mechanics, i.e., a "line-point-area" support.

Three locking fingers with rounded tips which can be retracted by compression of return springs as well known in the art emerge from locations formed in the receptacle 2. These fingers and their locations are not visible in FIG. 1. They retract on passage of the sleeve 31 and ensure a locking in the groove 37 (FIG. 2) when the latter arrives at their level, thus maintaining the sleeve 31 in a position such that a pull is exerted upon the object holder 3.

Only those parts of the arm 4 and the shaft 5, located inside the evacuated enclosure have been shown, the illustration excluding the manual controls for these components which are located outside, and the sealed leadthrough systems which make it possible for said components to displace longitudinally and/or rotate. These leadthrough systems and manual control systems are well known in the art.

If, considering FIG. 1, we draw a rectangular three-coordinate system OX, OY, OZ, then the arm 4 will be parallel to the OY axis extending from the outside to the inside of the enclosure, and the shaft 5 will be parallel to OX, with a similar orientation. Finally, the axis OZ is the up and down axis.

The arm 4, at its end disposed inside the enclosure, carries a mobile assembly constituted by two components 41 and 42, the former being solid with arm 4, the latter carrying guide rails 421 and 422 parallel to the axis OZ. A spring which has not been shown, establishes between the components 41 and 42 upward restoring force which compensates for the gravitational force applied to the component 42 which has to carry the object holder 3. To this end, a fork 43 is connected to the component 42; it possesses two beveledged teeth.

The shaft 5, parallel to OX, is provided at its end, inside the sealed enclosure, with a finger 51 welded on eccentrically (FIG. 1), so that rotation of the shaft 5 causes said finger to describe cylinder having for cross section a circle of diameter *e* of the order of 1 cm. The size of the finger 51 is such that it can penetrate easily into the cavity 38. This happens when the shaft 5 has itself been entered into the receptacle 2, by means of an opening 11 formed in the mounting 1, the latter having previously been moved into a marked position, referred to as the loading position.

The operation of the device is as follows: the cross-slide table is arranged in the position corresponding to loading. The object holder is placed on the fork 43. The airlock and the arm 4 are operated, in order to bring the object holder into the position in which the projections 32, 33 and 34 are located above the points 12, 13 and 14. Then, the shaft 5 is operated in order to engage the finger 51 in the cavity 38, after which the shaft 5 is rotated through 180° in order to lower sleeve 31 through a height substantially equal to *e*, this being a simple matter by reason of the oblong shape of the cavity 38.

Locking is effected automatically at the instant when the locking fingers of the receptacle 2 enter the groove 37. Then, the arm 4 and the shaft 5 are withdrawn in order to leave the mobile mounting free to move.

The invention is applicable likewise in the case where the axis OZ is not vertical, provided that the fork 43 is then supplemented by a leaf spring which can clip the sleeve 31 and thus maintain the object holder 43 in position in relation to the fork, this whatever the orientation of the axis OZ.

The invention makes it possible to improve the manufacturing efficiency of electronic masking apparatus, by doing away with the down times which are necessitated, in the absence of the device in accordance with the invention, by the evacuating of the enclosure after each exchange of specimen.

What we claim is:

1. A device for the precise positioning on a mobile mounting of an object holder introduced through an airlock into a sealed enclosure manipulated by means located outside said enclosure, utilizing movements of rotation about fixed axes, and of translation along said axes, said device comprising a first system, for displacement along a first axis (OY), means associated with said first system for displacing said object holder parallel to a second axis (OZ), and a second system, comprising means for locking said object holder to said mobile mounting, and means capable of application and subsequent withdrawal by a displacement in accordance with a third axis (OX), the axes OX, OY, OZ forming a rectangular three-coordinate system.

2. A system as claimed in claim 1, wherein said first system comprises an arm displaceable by translation on the shaft which is fixed and parallel to the axis (OY), and a mobile assembly in the form of a first component fixed to said arm and a second component capable of displacing in relation to the first in at least one direction parallel to the axis (OZ).

3. A device as claimed in claim 1 wherein said second system comprises a shaft carrying an eccentric finger which, by rotation of said shaft, drives said object holder in a direction parallel to the axes (OZ).

4. A device as claimed in claim 1, wherein said object holder comprises a rod penetrating into a sleeve positioned by a spring, said sleeve comprising an oblong cavity in which said eccentric finger of said shaft engages a locking system of fingers integral with said mobile mounting.

5. A device as claimed in claim 1, wherein said device furthermore comprises a system for adjusting said object holder on said mobile mounting, comprising three projections on said object holder and a support of the line-point-area kind, formed on said mobile mounting and designed to receive the three projections of said object holder.

* * * * *